United States Patent [19]

Park et al.

[11] Patent Number: 5,995,968
[45] Date of Patent: Nov. 30, 1999

[54] METHOD OF CREATING META DATA AND PROCESSOR LOAD DATA IN A MOBILE SWITCHING CENTER

[75] Inventors: Kwang Roh Park; Jae Wook Shin, both of Daejeon, Rep. of Korea

[73] Assignees: Electronics and Telecommunications Research Onstitute, Daejeon; Korea Telecommunication Authority, Seoul, both of Rep. of Korea

[21] Appl. No.: 08/982,512

[22] Filed: Dec. 2, 1997

[30] Foreign Application Priority Data

Dec. 16, 1996 [KR] Rep. of Korea ...................... 96-66264

[51] Int. Cl.⁶ .............................. G06F 17/30; H04Q 7/22
[52] U.S. Cl. ........................... 707/100; 707/10; 707/200; 455/428; 455/439; 455/560; 379/9
[58] Field of Search .................................... 707/100, 200, 707/10, 4; 455/445, 439, 428, 432, 517, 560, 95; 379/9, 84, 165, 308

[56] References Cited

U.S. PATENT DOCUMENTS

| | | | |
|---|---|---|---|
| 5,274,802 | 12/1993 | Altine ....................................... | 707/202 |
| 5,375,251 | 12/1994 | Pfundstein .............................. | 455/551 |
| 5,497,412 | 3/1996 | Lannen et al. .......................... | 455/432 |
| 5,564,071 | 10/1996 | Liou et al. ............................... | 455/520 |
| 5,588,042 | 12/1996 | Comer ..................................... | 455/413 |
| 5,745,892 | 4/1998 | Miyata et al. .......................... | 707/102 |
| 5,839,072 | 11/1998 | Chien ...................................... | 455/445 |

OTHER PUBLICATIONS

Shin, et al., New efficient method of generating processor load data and Meta Data Base in CMX–MX system, IEEE International Conference on Personal Wireless Communications, abstract only, Dec. 1997.

Theuretzbacher, N. "Enhanced chill tasking concept and language for a business communication system", Electr Commun v. 58, N. 2, abstract only, 1983.

*Primary Examiner*—Jean R. Homere
*Attorney, Agent, or Firm*—Antonelli, Terry, Stout & Kraus, LLP

[57] ABSTRACT

A method for directly performing a data analysis, a logical design and a physical design processes on an EDIF file and an initial data, without utilizing Troll relational Database system, to create an optimized schema, a meta data and a processor load (PLD) without any overlapped process. First, the EDIF file and the initial data file are received and an initial system environment is set for creating the meta data and the processor load data. Further, a DBMS_MODE.sp file and a DBMS_REL.sp file are created such that the database mode specification file represent a recorded definition of a SET mode defined in all the EDIF files, and such that the database relation specification file represent a recorded definition of the relation in all the EDIF files which are being converted into Chill Syntax Structure. Various meta data corresponding to each processor are created based on the catalogue of transaction files. Additionally, the data format specification files and link data files are used in creating the PLD.

6 Claims, 7 Drawing Sheets

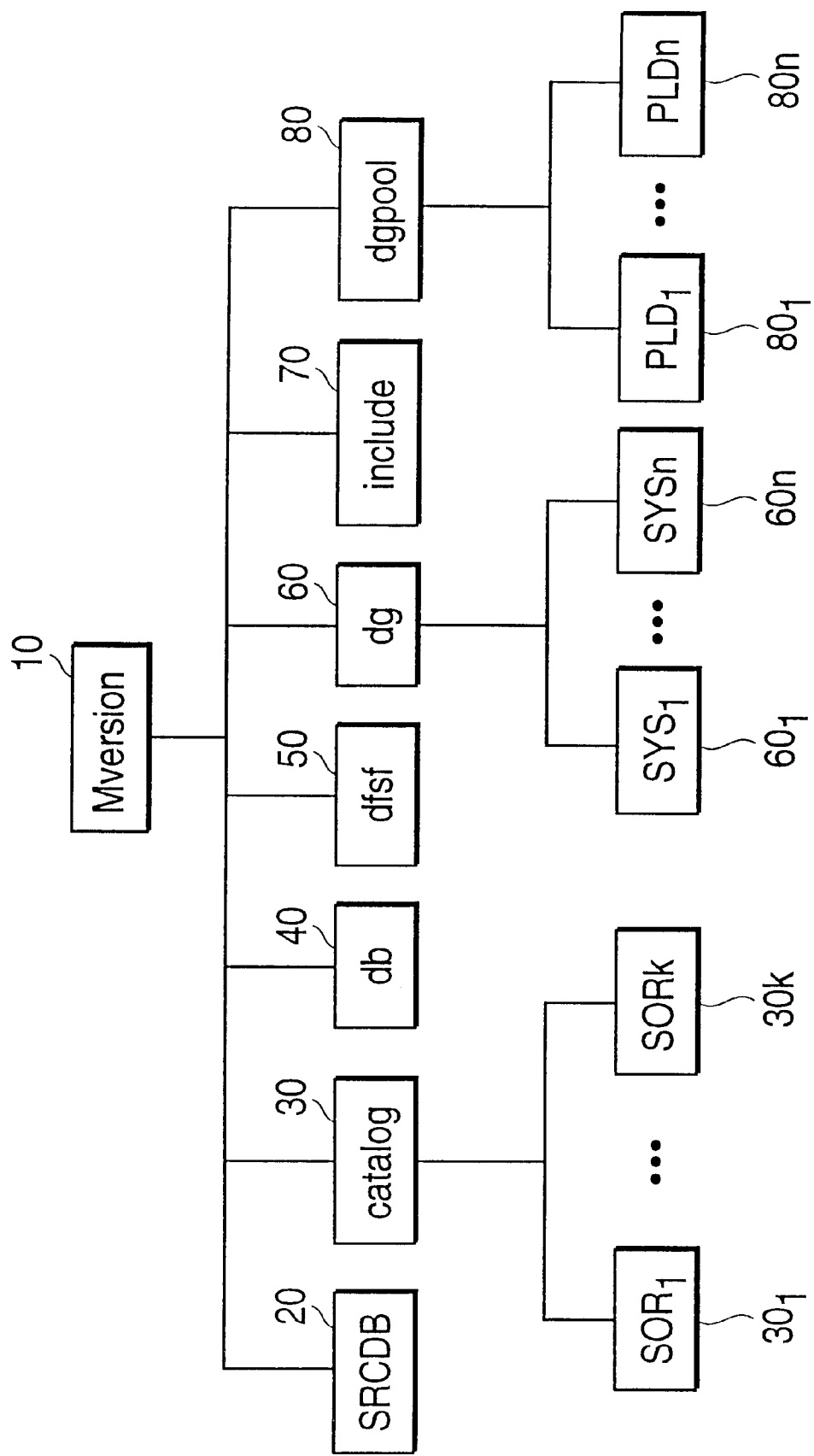

FIG. 2

<Structure of typical case>

\#

.r   or .f relation name

.t   a maximum number of tuples.

.l   a local processor name,

.g   a global processor name

.m   relation type

.e   relation storage pattern

.o   data type

.a   access right

.k   key access method

.d   domain   attribute name   attribute type.

. . .

. . .

<Structure of transaction case>

\#

.tr   transaction name

.tm   a maximum performance time of transaction

.cp   central processor name

.pr   the number of relations.

FIG. 3

[ an initial data of KEY value, an initial data of a first domain, that of a second domain, ......., and that of a final domain]

an initial data for a first tuple

[...] # an initial data for a second tuple

: :

[...] # an initial data for a final tuple

METHOD OF CREATING META DATA AND PROCESSOR LOAD DATA IN A MOBILE SWITCHING CENTER

BACKGROUND OF THE INVENTION

1. Field of the Invention

The present invention relates to a method of directly creating meta data and processor load data in a mobile switching center; and, more particularly, to a method of effectively processing a successive change in a plurality of data and establishing a multiplicity of object systems on a real time basis, to thereby reduce time and resource required during the definition and creation of data, and further overcome a mismatch between the data.

2. Description of the Prior Art

In TDX-10 MX Mobile Switching Center based on a real time access of distributed data, meta data and processor load data("PLD") are created to compile a source program, based on an Exchange Data Input Form("EDIF") file and an initial data file on off-line, and both of the created data are loaded to corresponding processor in the mobile switching center.

The process of creating the meta data and the processor load data in the mobile switching center may be mainly divided into three steps.

Specifically, one is a data analysis step of searching and analyzing data to be used in each application program; another is a logical design step of defining collected data as a predetermined model; and the other is a physical design step of modifying the modeled data into an inner operation form of the object systems.

More specifically, in the data analysis step, data(relation) information necessary for creating the application program is registered through a Database administration System by a software block administrator, and the registered data is consisted of a best optimized schema by a Database administrator.

In the logical design step, the meta data is created by a Make Catalog (MKCATE) through the use of the schema formed at the data analysis step, wherein the Make Catalog functions as a support set of the logical design step, and the meta data includes information necessary for creating the PLD of the object systems and information necessary for compiling the application program.

In the physical design step, it is checked whether the initial data file registered by a user correctly corresponds to a relation structure defined by the Data Administration System, through the aid of TDX-10 Data generator(which is referred to as "T10DG"), and the initial data file is converted into an Initialized Relation Object File(which is referred to as "IROF") to be contained in the PLD, and the IROF is then combined together to create the PLD converted into the inner operation form of the mobile switching center.

In order to efficiently perform a sequence of the steps previously described, the EDIF file and the initial data file registered by the software block administrator in the above steps, i.e., the data analysis step, the logical design step and the physical design step, should be accurately verified, and a complex correlation between the files should be syntactically controlled. In addition, since the system types may be differed from each other, a number of PLD files are in need of being concurrently created to test each of the object systems.

However, supporting tools which have been utilized in the data analysis step, the logical design step and the physical design step create the optimized schema and the meta data by employing Troll relational Database system used in UNIX environment, to thereby perform both the data analysis and the logical design steps. In this case, performance of the Troll relational Database system results in an increased processing time.

In addition, when an error is occurred at a file during the physical design step, since the data analysis and the logical design steps or overlapped steps are performed with respect to all files, the conventional method suffers from shortcomings that it results in the increased processing time and an increased resource application, and it is difficult to control a complex correlation between the files.

SUMMARY OF THE INVENTION

It is, therefore, a primary object of the invention to provide a method which is capable of directly performing a data analysis, a logical design and a physical design processes with respect to an EDIF(Exchange Data Input Form) file and an initial data file registered by an user, without utilizing Troll relational Database system, to thereby create a best optimized schema, meta data and processor load data without any overlapped process.

In accordance with a preferred embodiment of the present invention, there is provided a method of directly creating meta data and processor load data in a mobile switching center, which comprising the following steps:

(a) receiving an Exchange Data Input Form("EDIF") file and an initial data file, and setting an initial system environment for creating the meta data and the processor load data, wherein each of EDIF files is comprised of a multiplicity of relations, each of which being provided with a number of attributes;

(b) setting a directory environment containing a data base common file, and creating a data base mode specification file and a data base relation specification file, wherein the data base mode specification file represents that is recorded definition of SET mode defined at all the EDIF files, and the data base relation specification file represents that is recorded definition of the relation in all the EDIF files which being converted into Chill syntax structure;

(c) creating various meta data corresponding to each processor, based on catalogue of the EDIF files and catalogue of transaction files obtained at the step(a);

(d) setting an environment for creating Lock, overlapping, a partial distribution and Index information according to relation storage forms, and creating a plurality of data format specification files to be used in creating the processor load data; and (e) setting an environment for creating files of the processor load data in concordance with system types of the mobile switching center, creating a multiplicity of files for use in link during the creation of the processor load data, and creating the processor load data through the use of the multiplicity of files.

BRIEF DESCRIPTION OF THE DRAWINGS

The above and other objects and features of the present invention will become apparent from the following description of preferred embodiments given in conjunction with the accompanying drawings, in which:

FIG. 1 presents a diagram illustrating a directory configuration of a software necessary for directly creating meta data and processor load data("PLD") in a mobile switching center;

FIG. 2 offers a structure of the EDIF files in the mobile switching center;

FIG. 3 exemplifies a configuration of the initial data file registered by the user in the mobile switching center.

DETAILED DESCRIPTION OF THE PREFERRED EMBODIMENT

Figure 4A:
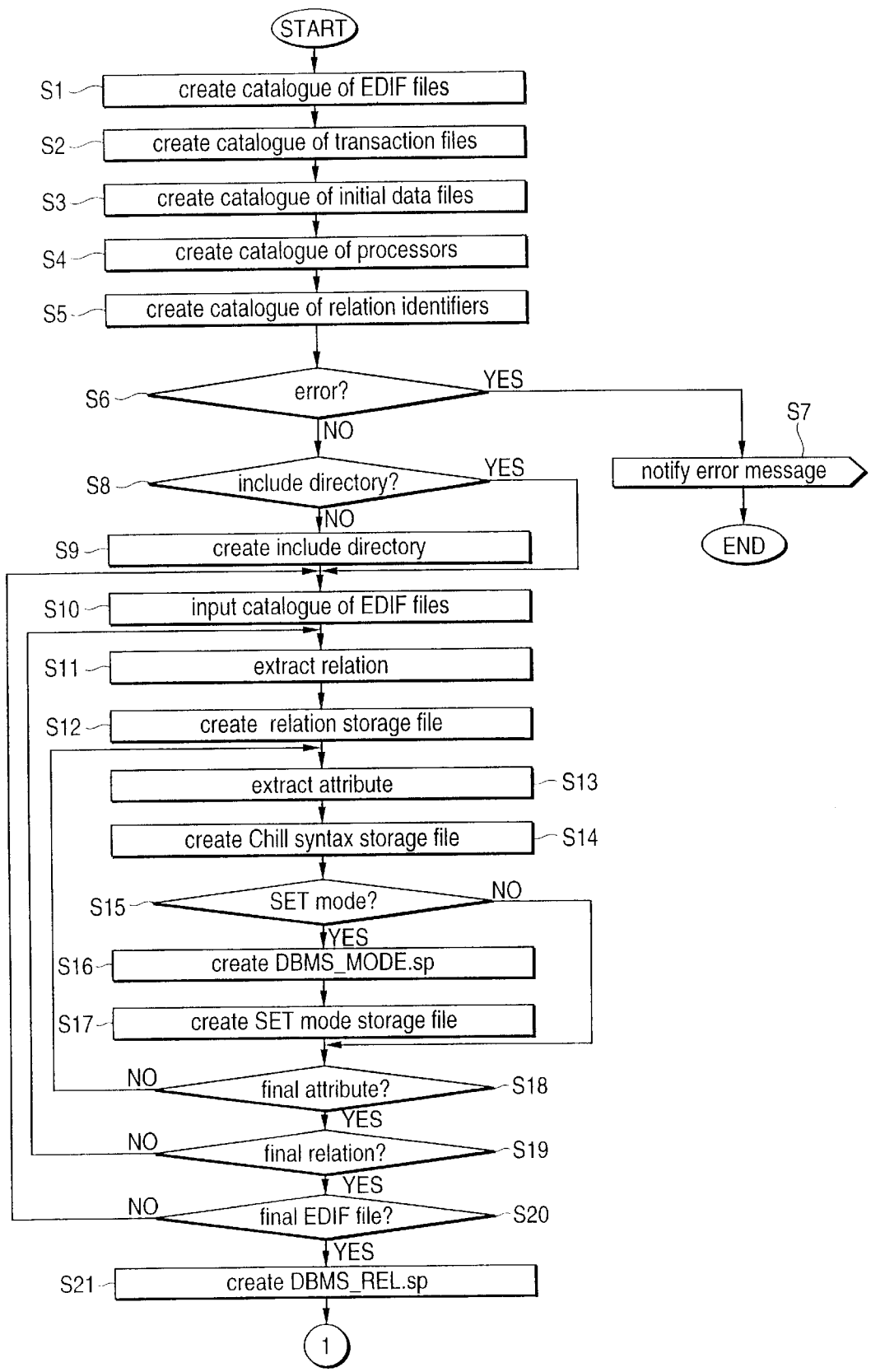
FIGS. 4A to 4D designate flowcharts illustrating a method of creating the meta data and the processor load data in the mobile switching center, in accordance with a preferred embodiment of the present invention, respectively.

This invention will be described in further detail by way of example with reference to the accompanying drawings. Like reference characters designate like or corresponding parts throughout the several views.

Referring to FIG. 1, there is shown a diagram illustrating a directory configuration of a software necessary for directly creating meta data and processor load data("PLD") in a mobile switching center. When a current version of the software used in the mobile switching center is M-version, integrated on the software is an SRCDB directory 20, a catalog directory 30, a db directory 40, a dfsf directory 50, a dg directory 60, a include directory 70 and a dgpool directory 80.

The SRCDB directory 20 is a directory associated with system type setting, for example, catalogue of an initial data file to be registered from an EDIF file and processor names required during the creation of the meta data and the program load data.

The catalog directory 30 is a directory to be stored the meta data created by processors $SOR_1$ to $SOR_k$, numbered $30_1$ to $30_k$ as shown in FIG. 1.

The db directory 40 serves to store therein the EDIF files registered by a block user administrator.

The dfsf(data format specification file) directory 50 serves to store therein information involved in duplication, distribution or lock to create the processor load data.

The dg directory 60 is adapted to store therein the initial data file registered by the block user, which is provided with a plurality of system types $SYS_1$ to $SYS_n$, numbered $60_1$ to $60_n$, as shown in FIG. 1, corresponding to various types of the mobile switching center.

The include directory 70 is utilized for storing therein a common file associated with a database necessary for compiling a source program.

The dgpool directory 80 serves to create the processor load data, which is capable of creating a multiplicity of processor load data $PLD_1$ to $PLD_n$, numbered $80_1$ to $80_n$, according to the system types.

Referring to FIG. 2, there is shown a structure of the EDIF files in the mobile switching center.

In the mobile switching center, data and code is independently set as much as possible to establish a data base system, to thereby perform an efficient data control, wherein a data model used therein is a relational data model. Accordingly, data to be used in each software block is in need of being structured in a two-dimensional relation form. The EDIF file represents a file specificated by structuring data used in software programs of corresponding block into the relation form by each block user, which is expressed in Block name.db pattern in many cases, and in Block name.tdb pattern in case of transaction.

In typical, each field in the EDIF file is as follows.

\# represents a separator for separating the relation.

Field of .r or .f represents that when tuples are accessed, it is accessed through the data base or directly to a memory. Positioned at the rear of field .r or .f is a relation name, which should be controlled by a predetermined rule to enhance decipherability and is unique in the overall mobile switching center.

Field of .t depicts the maximum number of tuples.

Field of .l denotes a local processor name, which denotes a processor of storing actual data and is possible to display a plurality of processors.

Field of .g represents a global processor name, which denotes a processor of storing virtual data and is possible to display the plurality of processors.

Field of .m represents a type of the relation, which denotes characteristics of data stored therein and includes, e.g., a mem type representing that the relation have been stored to the memory at all times, a dkb type representing that modified contents of the relation loaded in the memory is constantly backed up to a disk, and a dko type representing that the relation exists in the disk at all times.

Field of .e represents a storage pattern based on a storage location of the relation, which includes, e.g., an rep pattern denoting that the relation is contained in the plurality of processors in duplicate, an nor pattern denoting that the relation is contained in the processors in non-duplicate, a dis pattern denoting that tuples of the relation are distributively contained in the processors, a lor pattern denoting that the tuples are contained in the processors in duplicate, but values within the tuples in each of the processors are differed from each other, and a pdis pattern denoting that some of all the tuples is overlapped to be distributively stored in several processors.

Field of .o represents a type of data, which includes, e.g., a CAE type whose it's value depends on a switching center or a capacity of system, a CDE type whose the value is constant, and an SYS type whose an initial status is in the CDE characteristic and the extension is in the CAE characteristic.

Field of .a means access right, which includes, e.g., Select, Update, Insert, Delete, Lock, Unlock, Maxi, Mini, Sum, Count, and Avg.

Field of .k represents a key search method, which is able to search two keys and is provided with Seq, Index, Bin and Hash. Positioned at the rear of the field .k is an attribute name and an attribute type.

Field of .d means a domain, which is expressed based on the number of the attributes except the key. Similarly, positioned at the rear of the field .d is an attribute name and an attribute type.

In case the EDIF file is the transaction, a description of the respective fields is as follows.

\# is the separator for separating the relation.

Field of .tr represents a name of the transaction.

Field of .tm represents a maximum performance time during the transaction.

Field of .cp meaning a central processor represents a name of master processor to be performed the transaction.

Field of .pr represents information associated with data update in the processors, i.e., the number of the relations.

Referring to FIG. 3, there is shown a configuration of the initial data file registered by the user in the mobile switching center.

In FIG. 3, each tuple is expressed in "[. . . . ]" form. Further, each of the tuple is mapped to the Fields .k and .d in the EDIF file shown in FIG. 2 and is provided with an initial data of the Key value, an initial data of a first domain, an initial data of a second domain . . . , and an initial data of a final domain, and should be presented as many as the maximum number of the tuples, i.e., the Field .t shown in FIG. 2.

Turning to FIGS. 4A to 4D, there are shown flowcharts illustrating a method of creating the meta data and the processor load data in the mobile switching center, in accordance with a preferred embodiment of the present invention, respectively.

First, a system environment necessary for creating the meta data and the processor load data is set up.

In FIG. 4A, catalogue of the EDIF file and the transaction file registered in the system type are sequentially created from the SRCDB directory 20 shown in FIG. 1, at steps S1 and S2.

Thereafter, at step S3, catalogue of the initial data file are created based on the catalogue of the EDIF files. At step S4, catalogue of the processors defined on the system type are created to generate the meta data and the processor load data. Next, at step S5, it is created catalogue of an unique relation identifier in the mobile switching center.

At step S6, it is checked whether an error is generated at the above steps S1 to S5. If the error is generated in the conditional blanch step, the process proceeds to step S7 wherein an error message containing an error message code is furnished to an administrator or an operator and the process is terminated. If there is no the error in the above steps, data base common file necessary for compiling the source program, i.e., a data base mode specification file and a data base relation specification file are created in a sequent processing step. The data base mode specification file represents a file in which is recorded definition of SET modes defined at all the EDIF files, and the data base relation specification file represents a file in which is recorded definition of the relation in all the EDIF files which being converted into Chill syntax structure.

Specifically, if the direct access relation is employed, the data base relation specification file is adapted to determine a structure of the relation during the compilation of the source program.

At step S8, it is checked whether the include directory 70 exists or not, which is positioned on the data base common file. In case of the absence of the include directory 70, the include directory 70 is created at step S9.

Subsequently, at step S10 the catalogue of the EDIF files obtained from the SRCDB directory 20 is inputted.

At step S11, the relation is extracted from the catalogue of the inputted EDIF files. At step S12, it is created a storage file for storing the relation name necessary for the creation of the data base relation specification file. In a subsequent step S13, the attribute presented in the relation is extracted and at step S14 a storage file with Chill syntax form is created.

At step S15, it is checked whether the extracted attribute has been set as the SET mode, wherein if yes, the data base mode specification file DBMS_MODE.sp to be utilized for the compilation of the source program is created at step S16, and the SET mode storage file necessary for the creation of the data base relation specification file is then created at step S17. Next, the process proceeds to step S18.

At the preceding step S15, if the extracted attribute is not the SET mode, the process proceeds to the step S18 of checking whether a current attribute is final or not.

In the conditional blanch step S18 if the current attribute is not final, i.e., since a corresponding relation has several attributes, the above steps S13 to S17 are iteratly performed with respect to all the attributes of the corresponding relation. In general, one EDIF file is comprised of a multiplicity of relations, each of which being provided with a number of attributes.

If the current attribute is final at step S18, the process proceeds to step S19 wherein it is checked whether a current relation is final or not. In the conditional blanch step S19, if the current relation is not final, i.e., since a corresponding EDIF file has several relations, the above steps S11 to S18 are iteratly performed with respect to all the relations. If the current relation is final, since the processing for one EDIF file among the catalogue of the inputted EDIF files has been completed, the process proceeds to step S20 wherein it is checked whether a current EDIF file is final or not. At step S20, if a current EDIF file is not final, the above steps S10 to S19 are iteratly performed with respect to sequent EDIF files.

In the conditional blanch step S20 if the current EDIF file is final, the data base relation specification file DBMS_REL.sp is created by combining the relation name storage file obtained at step S12, the SET mode storage file obtained at step S13 and the Chill syntax storage file obtained at step S14.

Figure 4B:
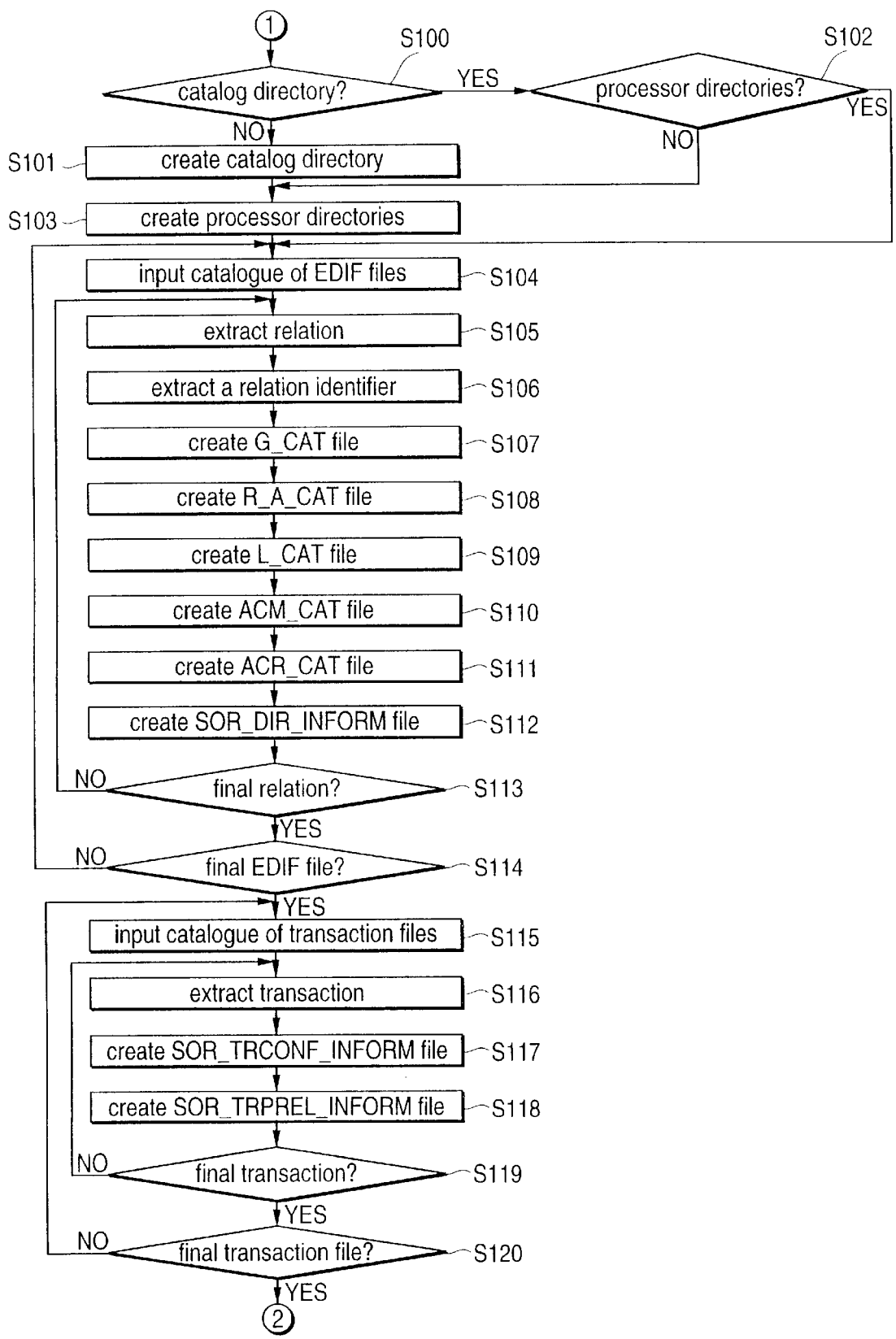
Figure 4C:
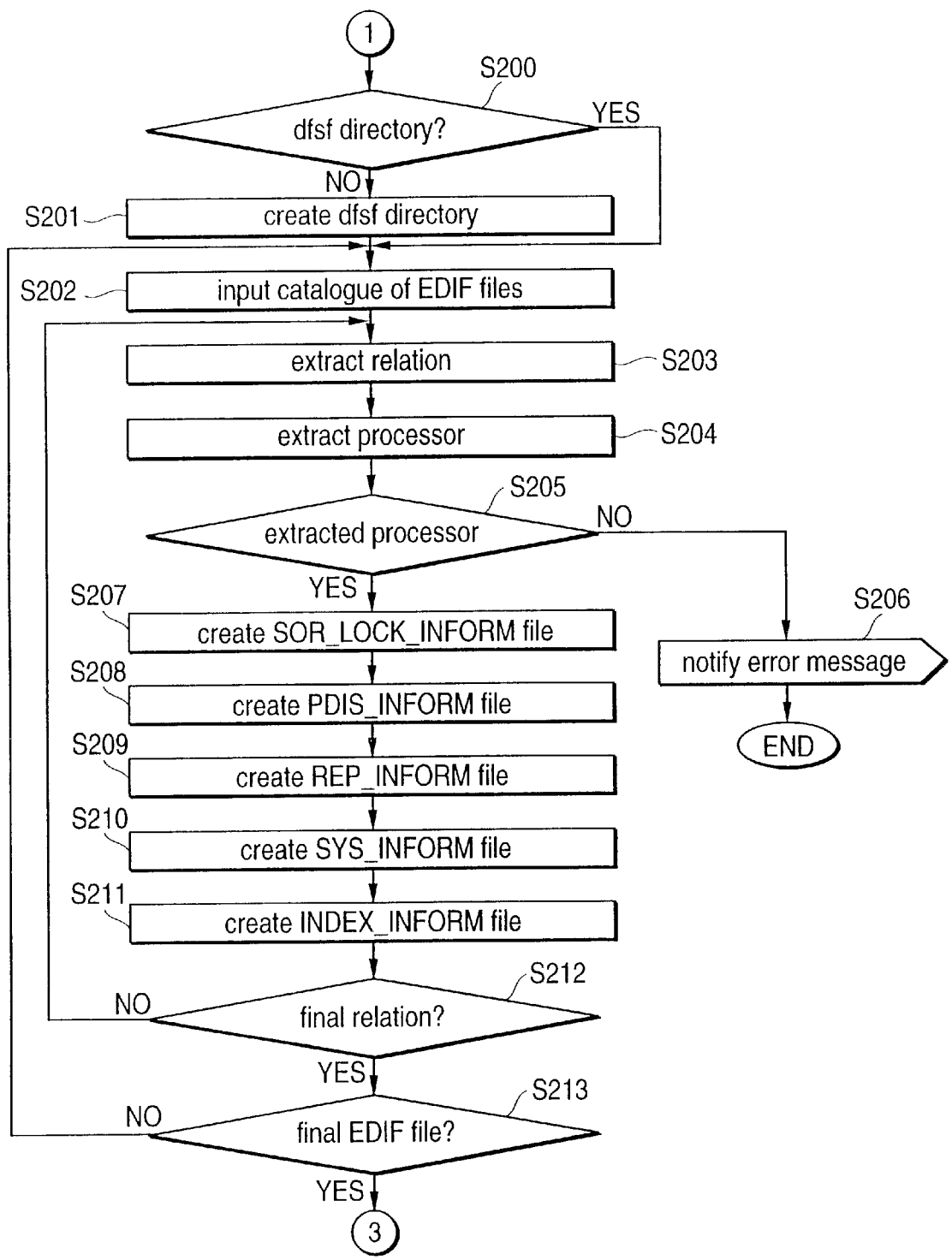

If the process of creating the DBMS_MODE.sp and the DBMS_REL.sp necessary for the creation of the source program are terminated, the process proceeds to a first step S100 in FIG. 4B.

At step S100, it is checked whether the catalog directory 30 exists or not, which stores the catalogue of the meta data created from each of the processors. If there is no the catalog directory 30, the catalog directory 30 is created at step S101 and the SOR directories are created with respect to each of the processors defined in the system type at step S103.

In the conditional blanch step S100 if there is the catalog directory 30, the process proceeds to step S102 wherein it is checked whether corresponding SOR directories exists on each of the processors or not. If there is no the processor directories, then the SOR directories are created on each of the processors defined in the system type as mentioned hereinabove, to thereby complete the system environment setting for creating the catalogue.

Subsequently, at step 8104, the catalogue of the EDIF files obtained from the SRCDB directory 20 in the initial system environment setting process are inputted.

Next, a relation is extracted from the catalogue of the inputted EDIF file at step S105, and a corresponding relation identifier is extracted from the catalogue of the relation identifier at step S106.

In an ensuing step S107, a G_CAT file is created based on the extracted information, i.e., the relation and the corresponding relation identifier, wherein the G_CAT file is adapted to store relation information, e.g., the relation identifier, the relation name, the relation type and the storage pattern thereof, and the number of the tuples on the respective processors.

At step 5108, an R_A_CAT file is created, wherein the R_A_CAT file includes attribute associated information, e.g., the relation identifier, an attribute identifier, an attribute name, an attribute type and the number of the attributes, and a sequence defined by the attributes in the relation.

After that, at step S109 an L_CAT file is created, wherein the L_CAT file includes information involved in the relations and the attributes, e.g., the relation identifier, the relation name, the number of the attributes, catalogue of the attributes, the number of key attributes and catalogue of the key attributes according to each of the processors.

Subsequently, at step S110 an ACM_CAT file is created, which has information involved in an access method of the respective attributes in the relation, e.g., the relation name, the attribute name and the access method.

And then, an ACR_CAT file is created at step S111 wherein access right information for each of the relations is stored therein. At step S112, it is created an SOR_DIR_INFORM file for storing information involved in the direct access relation, e.g., the relation name, a serial number, the number of the tuples in the relations and a subindex period.

At step S113, after being created the afore-mentioned files with respect to the extracted relations, it is checked whether a current relation is final or not. In the conditional blanch step S113, if the current relation is not final (which means that corresponding EDIF file has the plurality of relations), the above steps S105 to S112 are iterately performed with respect to all the relations; if the current relation is final the process proceeds to step S114 wherein it is checked whether a current EDIF file is final.

In the conditional blanch step S114, if the current EDIF file is not final, the above steps S104 to S113 are iterately performed with respect to a sequent EDIF file; if the current EDIF file is final, the process proceeds to step S115 wherein it is inputted the catalogue of the transaction files obtained at the process of setting the initial system environment(step S2).

At step S116, a transaction is extracted from the catalogue of the transaction file.

At step S117, it is created an SOR_TRCONF_INFORM file which stores, for example, a name of the extracted transaction, an identifier of the transaction, a maximum performance time of the transaction and the number of performed processors.

At step S118 it is created an SOR_TRPREL_INFORM file which stores, for example, the extracted transaction name, the transaction identifier, the number of the transaction relations and the number of processors to be performed.

At step S119, after being created the afore-mentioned files with respect to the extracted transactions, it is checked whether a current transaction is final or not.

In the conditional blanch step S119, if the current transaction is not final, the above steps S116 to S118 are iterately performed with respect to a sequent transaction; if the current transaction is final the process proceeds to step S120 wherein it is checked whether a current transaction file is final.

In the conditional blanch step S120, if the current transaction file is not final, the above steps S115 to S119 are iterately performed with respect to a sequent transaction file; if the current transaction file is final, then the creation process of the catalogue acting as the meta data is terminated. After then, the process proceeds to step S200 in FIG. 4C.

At step S200, it is checked whether the dfsf directory 50 positioning at the associated file exists or not, in order to create the dfsf including the Lock information, the duplication, a partial distribution and index information according to the relation storage form. In case of the absence of the dfsf directory 50 at step S200, the process proceeds to step S201 wherein the dfsf directory 50 is created. Subsequently, at step S202 the catalogue of the EDIF file obtained at the step Si is inputted. At step S203, a relation is extracted from the catalogue of the inputted EDIF file. At step S204, a processor is extracted from the field of the processors.

At step S205, in order to determine whether the extracted processor is that defined at the system type, it is checked whether the extracted processor is contained in the processor catalogue obtained at the step S4.

In the conditional blanch step S205, if the extracted processor is offset from the processor catalogue, the error message containing an error message code is notified to the administrator and the operator at the step S206. The process is then ended. If the extracted processor is contained in the processor catalogue, the process proceeds to step S207 wherein it is created an SOR_LOCK_INFORM file which stores the relation identifiers on each of the processors, with respect to the relation whose the access right field is defined as LOCK.

At step S208, it is created a PDIS_INFORM file which include the relation identifier, the number of distributed processors and name of the processors, with respect to the relation whose the storage form field is defined as the PDIS.

At step S209, it is created an REP_INFORM file which includes, e.g., the relation identifier, the number of duplicated processors and the catalogue thereof, with respect to the processors with the duplicated relations.

At step S210, an SYS_INFORM file acting as the system associated file is created.

At step S211, it is created an INDEX_INFORM file which includes information, e.g., the relation identifier and a size of subindex with respect to the relation whose the access method of the key attribute is defined as INDEX. After being processed the extracted relation obtained at the step S203, it is checked at step S212 whether a current relation is final or not.

In the conditional blanch step S212, if the current relation is not final, the above steps S203 to S211 are sequentially applied with respect to sequent relations; if the current relation is final, the process proceeds to step S213 wherein it is checked whether a current EDIF file is final.

In the conditional blanch step S213, if the current EDIF file is not final, the above steps S202 to S212 are iterately performed with respect to sequent EDIF files; if the current EDIF file is final, then the creation process of the data format specification file is ended. After that, the process proceeds to step S300 in FIG. 4D.

Figure 4D:
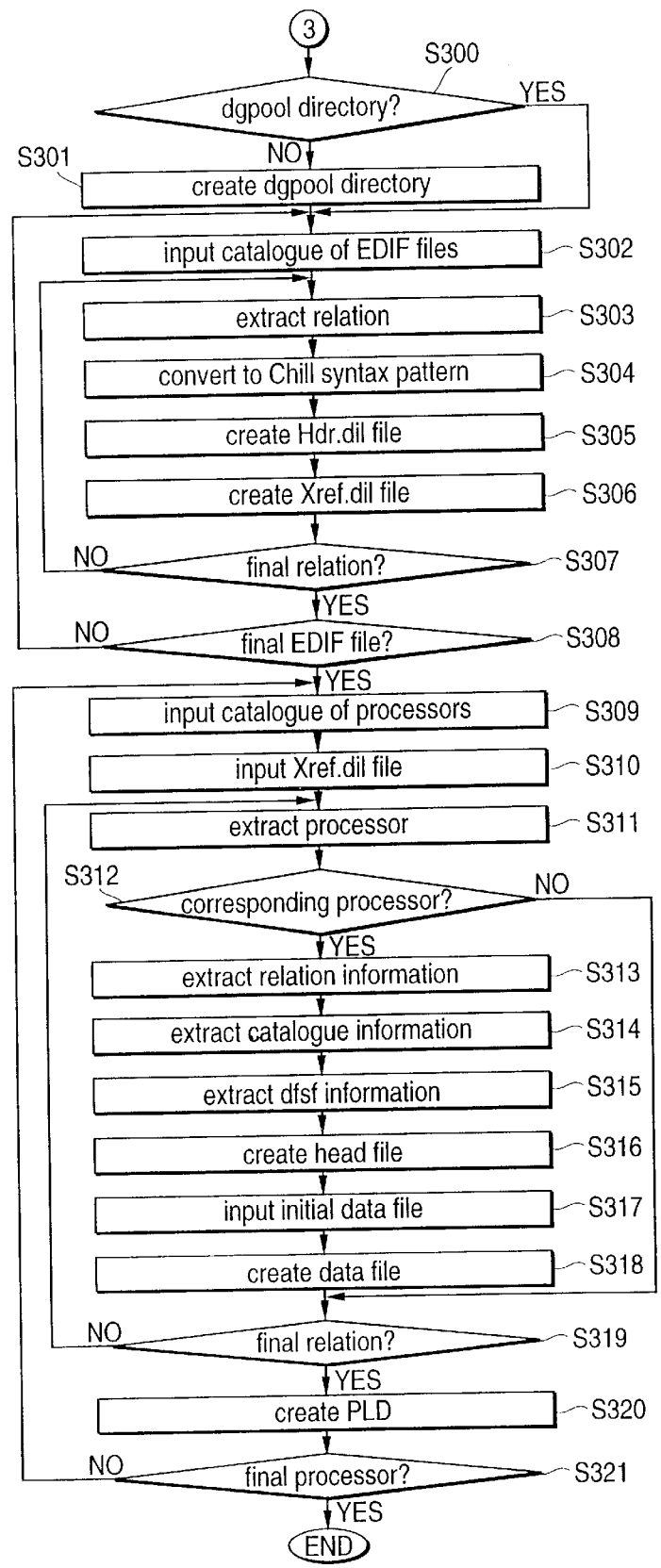

Referring to FIG. 4D, there is shown a flowchart illustrating a process of creating the processor load data through the application of an Hdr.dil and an Xref.dil files, each of which is need to create the IROF file during the creation of the processor load data in the system types of the mobile switching center.

At step S300, it is checked whether the dgpool directory 80 positioning at the associated file exists or not. In case of the absence of the dgpool directory 80 at step S300, the process proceeds to step S301 wherein the dgpool directory 80 is created. Subsequently, at step S302 the catalogue of the EDIF file obtained at the step Si are inputted.

At step S303, a relation is extracted from the catalogue of the inputted EDIF file.

At step S304, the relation definition of the EDIF file is converted into a DIL(Data Input Language) format which being the Chill syntax pattern, which is used to create the IROF file during the creation of the processor load data for each of the system types of the mobile switching center.

At step S305, the Hdr.dil file containing all converted data derived at step S304 is created. At step S306, the Xref.dil file is created wherein the Xref.dil file includes the relation identifier, the number of tuples, a type of the data, catalogue of the local and global processors, and is utilized for linking the IROF during the creation of the processor load data. The IROF file is linked to a portion of actual relation data of the processor load data, and is provided with a head portion having various information and a data portion having an initial value of the actual relation data. The IROF file is also described in F_relation identifier.

After being processed the extracted relation obtained at the step S303, it is checked at step S307 whether a current relation is final or not.

In the conditional blanch step S307, if the current relation is not final, the above steps S303 to S306 are sequentially applied with respect to a sequent relation; if the current relation is final, the process proceeds to step S308 wherein it is checked whether a current EDIF file is final.

In the conditional blanch step S308, if the current EDIF file is not final, the above steps S302 to S307 are iterately performed with respect to a sequent EDIF file; if the current EDIF file is final, then a process of creating files of the processor load data to be loaded to the processors in the mobile switching center is performed.

More specifically, the catalogue of the processors derived at step S4 is inputted at step S309, and the Xref.dil file derived at the above step S306 is inputted at step S310.

Thereafter, a processor is extracted from the inputted Xref.dil file at step S311. It, at step S312, is checked whether the extracted processor corresponds a processor to be employed to creating the processor load data.

In the conditional blanch step S312, if the extracted processor corresponds thereto, then corresponding relation information is retrieved at step S313, and thereafter, information for various meta data stored at the catalogue directory is retrieved at step S314. And that, the dfsf information containing the PDIS_INFORM, the REP_INFORM and the SYS_INFORM files derived at the dfsf creation process is retrieved at step S315, and the head file is created at step S316. At step S317, the initial data file is inputted, wherein the initial data file is registered by the software block administrator from the catalogue of the initial data file defined according to the system types.

At step S318, the data file is created.

In the conditional blanch step S312, if the extracted processor is not the corresponding processor, then the process proceeds directly to step S318 without performing the above steps S313 to S318.

After being processed the extracted relations obtained at the step S313, it is checked at step S319 whether a current relation is final or not.

In the conditional blanch step S319, if the current relation is not final, the above steps S311 to S318 are sequentially applied with respect to a sequent relation; if the current relation is final, the process proceeds to step S320 wherein the processor load data is created by combining the head file obtained at step S316 and the data file obtained at step S318 and then loaded to the corresponding processor.

Subsequently, it is checked at step S321 whether a current processor is final in the processor catalogue inputted at the above step S309.

In the conditional blanch step S321, if the current processor is not final, the above steps S309 to S320 are iterately performed with respect to a sequent processor; if the current processor is final, then the above processes are performed.

As previously mentioned, the present invention is capable of directly performing the data analysis, the logical design and the physical design processes with respect to the EDIF (Exchange Data Input Form) file and the initial data file registered by the administrator, thereby effectively meeting a successive data fluctuation in the mobile switching center with a large capacity and managing the correlation between data.

Furthermore, the present invention is capable of drastically reducing time required during the data creation and creating a number of processor load data files in response to different system types, thereby allowing a data manager to deal easily with bulky data and considerably reducing a package fabricating schedule in development of the mobile switching center.

While the present invention has been described with reference to the particular embodiments, it will be apparent to those skilled in the art that various changes and modifications may be made without departing from the spirit and scope of the invention as defined in the following claims.

What is claimed is:

1. A method of directly creating meta data and processor load data in a mobile switching center, which comprising the following steps:

(a) receiving an Exchange Data Input Form("EDIF") file and an initial data file, and setting an initial system environment for creating the meta data and the processor load data, wherein each of EDIF files is comprised of a multiplicity of relations, each of which being provided with a number of attributes;

(b) setting a directory environment containing a data base common file, and creating a data base mode specification file and a data base relation specification file, wherein the data base mode specification file represents that is recorded definition of SET mode defined at all the EDIF files, and the data base relation specification file represents that is recorded definition of the relation in all the EDIF files which being converted into Chill syntax structure;

(c) creating various meta data corresponding to each processor, based on catalogue of the EDIF files and catalogue of transaction files obtained at the step(a);

(d) setting an environment for creating LOCK, duplicating, a partial distribution and Index information according to relation storage forms, and creating a plurality of data format specification files to be used in creating the processor load data; and (e) setting an environment for creating files of the processor load data in concordance with system types of the mobile switching center, creating a multiplicity of files for use in link during the creation of the processor load data, and creating the processor load data through the use of the multiplicity of files.

2. The method according to claim 1, wherein said step (a) of setting the initial system environment, which includes:

(a1) creating catalogue of the EDIF files, catalogue of the transaction file, catalogue of the initial data file, catalogue of the processors defined on the system types, and catalogue of an unique relation identifier, wherein the catalogue of the initial data file are created based on the catalogue of the EDIF files; and (a2) checking whether an error is generated at the above step (a1), wherein if the error is generated thereon, an error message containing an error message code is notified to an administrator; and if there is no the error, a data base common file necessary for compiling a source program is created.

3. The method according to claim 1, wherein said step (b) of creating the data base mode specification file and the data base relation specification file, which includes:

(b1) checking whether an include directory exists or not, the include directory being utilized for storing therein the database common file necessary for compiling the source program, wherein in case of the absence of the include directory, the include directory is created and the catalogue of the EDIF files obtained at the step (a) is then inputted;

(b2) extracting a relation from the catalogue of the inputted EDIF file and creating a storage file of relation name;

(b3) extracting an attribute from the relations and creating a storage file with Chill syntax form;

(b4) checking whether the extracted attribute has been set as the SET mode, and creating the data base mode specification file and a SET mode storage file, if the extracted attribute has been set as the SET mode;

(b5) checking whether a current attribute is final, and iteratively performing the above steps (b3) to (b4) with respect to all the attributes in the relation corresponding thereto until the final attribute is determined, if the current attribute is not final;

(b6) checking whether a current relation is final or not, and iteratively performing the above steps (b2) to (b5) with respect to all the relations until the final attribute is determined, if the current relation is not final;

(b7) checking whether a current EDIF file is final, and iteratively performing the above steps (b1) to (b6) with respect to sequent EDIF files until the final EDIF file is determined, if the current EDIF file is not final; and (b8) creating, after being performed the step (b7) until the final EDIF file is determined, the data base 10 relation specification file by combining the relation name storage file obtained at the step (b2), the SET mode storage file obtained at the step (b4) and the Chill syntax storage file obtained at the step (b3).

4. The method according to claim 1, wherein said step (c) of creating the meta data, which includes:

(c1) checking whether a catalog directory and processor directories exist or not, and creating the catalog directory and the processor directory if there is no both, wherein the catalog directory stores the catalogue of the meta data created from each of the processors, the processor directories being created with respect to each of the processors defined in the system types;

(c2) inputting the catalogue of the EDIF files obtained at the step (a);

(c3) extracting a relation and a corresponding relation identifier from the catalogue of the inputted EDIF file and the catalogue of the relation identifier, respectively;

(c4) creating, based on the extracted relation and the extracted identifier, a G_CAT file having relation associated information, an R_A_CAT file having attribute associated information, an L_CAT file having the attribute associated information corresponding to each of the processors, an ACM_CAT file having information involved in access method of the attributes in the relation, an ACR_CAT file having access right information for each of the relations, and an SOR_DIR_INFORM file having information involved in direct access relation;

(c5) checking, after being terminated the above step (c4), whether a current relation is final or not, and iterately performing the above steps (c3) to (c4) with respect to all the relations until the final relation is determined, if the current relation is not final;

(c6) checking whether a current EDIF file is final or not, and iteratively performing the above steps (c2) to (c5) with respect to all the EDIF files until the final EDIF file is determined, if the current EDIF file is not final;

(c7) after being performed the above step (c6) until the final EDIF file is determined, inputting the catalogue of the transaction files obtained at the step (a);

(c8) extracting a transaction from the catalogue of the transaction file, and creating an SOR_TRCONF_INFORM file and an SOR_TRPREL_INFORM file, wherein the SOR_TRCONF_INFORM file includes a name of the extracted transaction, an identifier of the transaction, a maximum performance time of the transaction and the number of performed processors, and the SOR_TRPREL_INFORM file includes the extracted transaction name, the transaction identifier, the number of the transaction relations and the number of processors to be performed;

(c9) checking whether a current transaction is final or not, performing the above step (c8) with respect to all the transactions until the final transaction is determined, if the current transaction is not final; and (c10) checking whether a current transaction file is final or not, and performing the above steps (c7) to (c9) with respect to all the transaction files until the final transaction file is determined, if the current transaction file is not final.

5. The method according to claim 1, wherein said step (d) of creating the data format specification files, which includes:

(d1) checking whether the data format specification file directory exists or not, and creating the data format specification file directory in case of the absence of the directory;

(d2) inputting the catalogue of the EDIF file obtained at the step (a);

(d3) extracting a relation and a processor from the catalogue of the inputted EDIF file and the field of the processors, respectively;

(d4) checking whether the extracted processor is contained in the processor catalogue obtained at the step (a); creating an SOR LOCK_INFORM file containing the relation identifiers corresponding to each of the processors with respect to the relation whose the access right field is defined as LOCK, a PDIS_INFORM file containing the relation identifier, the number of distributed processors and name of the processors with respect to the relation whose the storage form field is defined as PDIS, an REP_INFORM file containing the relation identifier, the number of duplicated processors and the catalogue thereof with respect to the processors with the duplicated relations, an SYS_INFORM file containing system associated information, and an INDEX_INFORM file containing the relation identifier and a size of subindex with respect to the relation whose the access method of the key attribute is defined as INDEX, If the extracted processor is contained in the processor catalogue; and notifying the error message to the administrator if the extracted processor is offset from the processor catalogue;

(d5) checking whether a current relation is final or not, and iteratively performing the above steps (d3) to (d4)

with respect to all the relations until the final relation is determined, if the current relation is not final; and (d6) checking whether a current EDIF file is final or not, and iteratively performing the above steps (d2) to (d5) with respect to all the EDIF files until the final EDIF file is determined, if the current EDIF file is not final.

6. The method according to claim 1, wherein said step (e) of creating the processor load data, which includes:

(e1) checking whether a dgpool directory exists or not, and creating the dgpool directory in case of the absence of the dgpool directory, wherein the dgpool directory creates a multiplicity of program load data according to the system types;

(e2) inputting the catalogue of the EDIF file obtained at the step (a);

(e3) extracting a relation from the catalogue of the inputted EDIF file, converting the relation definition of the EDIF file into a DIL(Data Input Language) format which being the Chill syntax pattern, and creating an Hdr.dil file containing all converted data derived at the above step (e3) and an Xref.dil file containing the relation identifier, the number of tuples, a type of the data, catalogue of a local and a global processors, wherein the Hdr.dil file is used to create an Initialized Relation Object File("IROF") to be contained in the processor load data, and the Xref.dil file is utilized for linking the IROF during the creation of the processor load data;

(e4) checking whether a current relation is final or not, and performing the above step (e3) with respect to all the relations until the final relation is determined, if the current relation is not final;

(e5) checking whether a current EDIF file is final or not, and iteratively performing the above steps (e2) to (e4) with respect to all the EDIF files until the final EDIF file is determined, if the current EDIF file is not final;

(e6) inputting the catalogue of the processors derived at the step (a) and the Xref.dil file derived at the above step (e3);

(e7) extracting a processor from the inputted Xref.dil file;

(e8) checking whether the extracted processor corresponds a processor to be employed to creating the processor load data, extracting corresponding relation information, information for various meta data stored at the catalogue directory, and the dfsf information containing the PDIS_INFORM, the REP_INFROM and the SYS_INFORM files, if the extracted processor corresponds thereto, creating a head file, inputting the initial data file from the catalogue of the initial data file defined according to the system types, to thereby create a data file;

(e9) receiving sequentially the Xref.dil file with respect to all the relations, extracting a processor to be employed to creating the processor load data, and performing the above step (e8) on the extracted processor;

(e10) after being performed the above step (e9) on the final relation, creating the processor load data to be loaded to the corresponding processor by combining the head file and the data file; and (e11) repeating the above steps (e6) to (e10) until the final processor to be employed to creating the processor load data is determined.

* * * * *